(12) United States Patent
Teng et al.

(10) Patent No.: US 8,073,282 B2
(45) Date of Patent: Dec. 6, 2011

(54) SCALING FILTER FOR VIDEO SHARPENING

(75) Inventors: Chia-Yuan Teng, San Diego, CA (US); King-Chung Lai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 980 days.

(21) Appl. No.: 11/781,797

(22) Filed: Jul. 23, 2007

(65) Prior Publication Data

US 2009/0028458 A1    Jan. 29, 2009

(51) Int. Cl.
*G06K 9/40* (2006.01)
*G06K 9/32* (2006.01)

(52) U.S. Cl. ......... 382/260; 382/263; 382/275; 382/298

(58) Field of Classification Search .................. 382/263, 382/275, 298
See application file for complete search history.

(56) References Cited

U.S. PATENT DOCUMENTS

| | | | |
|---|---|---|---|
| 5,422,827 A * | 6/1995 | Niehaus | 702/190 |
| 6,281,873 B1 * | 8/2001 | Oakley | 345/418 |
| 6,738,072 B1 * | 5/2004 | MacInnis et al. | 345/629 |
| 7,259,796 B2 * | 8/2007 | Sha et al. | 348/581 |
| 7,408,590 B2 * | 8/2008 | Huang et al. | 348/581 |
| 7,411,628 B2 * | 8/2008 | Tian et al. | 348/581 |
| 7,782,401 B1 * | 8/2010 | Chou | 348/581 |
| 2003/0080981 A1 * | 5/2003 | Lin et al. | 345/660 |
| 2004/0086038 A1 * | 5/2004 | Kilbank | 375/240 |

FOREIGN PATENT DOCUMENTS

WO    WO 03036943 A1    5/2003

OTHER PUBLICATIONS

International Search Report and Written Opinion—PCT/US2008/070907, International Search Authority—European Patent Office—May 20, 2009.
European Search Report—EP08006402—Search Authority—Munich—May 13, 2009.

* cited by examiner

*Primary Examiner* — Brian Werner
*Assistant Examiner* — Utpal Shah
(74) *Attorney, Agent, or Firm* — Kevin T. Cheatham

(57) ABSTRACT

A device has a single scaling filter to filter a video signal once to perform both sharpening and scaling. A memory stores original scaling filter coefficients for the scaling filter. An integrated circuit calculates new sharpening-scaling filter coefficients derived from the original scaling filter coefficients and one of sharpening filter coefficients for a sharpening filter and a sharpening strength and applies the new sharpening-scaling filter coefficients to the single scaling filter.

25 Claims, 10 Drawing Sheets

SCALING FILTER FOR VIDEO SHARPENING

BACKGROUND

1. Field

The present disclosure relates generally to the field of video processing and, more specifically, to techniques for integrating scaling and filtering in a standalone module.

2. Background

The visual appearance of a video signal may be significantly improved by emphasizing the high frequency components of an image. Sharpening is such a practice to enhance the local contrast at boundaries, and has become one of the most important features in image processing. Among many solutions proposed in the past, the "unsharp masking with linear high pass filtering" has proven to be a simple and effective method to enhance an image. The video signal may be further sharpened with a sharpening filter.

There is therefore a need in the art for techniques for integrating scaling and filtering in a standalone module with a single scaling filter.

SUMMARY

Techniques for integrating scaling and filtering in a standalone module are described herein. In one configuration, a device comprising a single scaling filter to filter a video signal once to perform both sharpening and scaling is provided. The device includes a memory to store original scaling filter coefficients for the scaling filter. The device also includes an integrated circuit to calculate new sharpening-scaling filter coefficients derived from the original scaling filter coefficients and one of sharpening filter coefficients for a sharpening filter and a sharpening strength and to apply the new sharpening-scaling filter coefficients to the single scaling filter.

In an aspect, an integrated circuit is provided. The integrated circuit comprises a single scaling filter to filter a video signal once to perform both sharpening and scaling. The integrated circuit includes a memory to store original scaling filter coefficients for the scaling filter. The integrated circuit also includes a circuit to calculate new sharpening-scaling filter coefficients derived from the original scaling filter coefficients and one of sharpening filter coefficients for a sharpening filter and a sharpening strength and to apply the new sharpening-scaling filter coefficients to the single scaling filter.

In a still further aspect, a computer program product is provided. The computer program product includes a computer readable medium having instructions for causing a computer to filter a video signal x once to perform both sharpening and scaling according to $$z_q = \sum_{i=-\frac{m}{2}+1}^{\frac{m}{2}} d_i x_{\lfloor \frac{q}{s} \rfloor + i}$$

where $d_i$ are new sharpening-scaling filter coefficients derived from at least sharpening filter coefficients and original scaling filter coefficients of a scaling filter; m denotes an even number of taps; s denotes the scaling ratio; q denotes a coordination index after scaling; and i is an index for a tap of the scaling filter.

In a still further aspect, a processor with a single scaling filter to filter a video signal once to perform both sharpening and scaling is provided. The processor includes a memory to store original scaling filter coefficients for the scaling filter. The processor also includes an integrated circuit to calculate new sharpening-scaling filter coefficients derived from the original scaling filter coefficients and one of sharpening filter coefficients for a sharpening filter and a sharpening strength and applying the new sharpening-scaling filter coefficients to the single scaling filter.

Additional aspects will become more readily apparent from the detailed description, particularly when taken together with the appended drawings

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1:
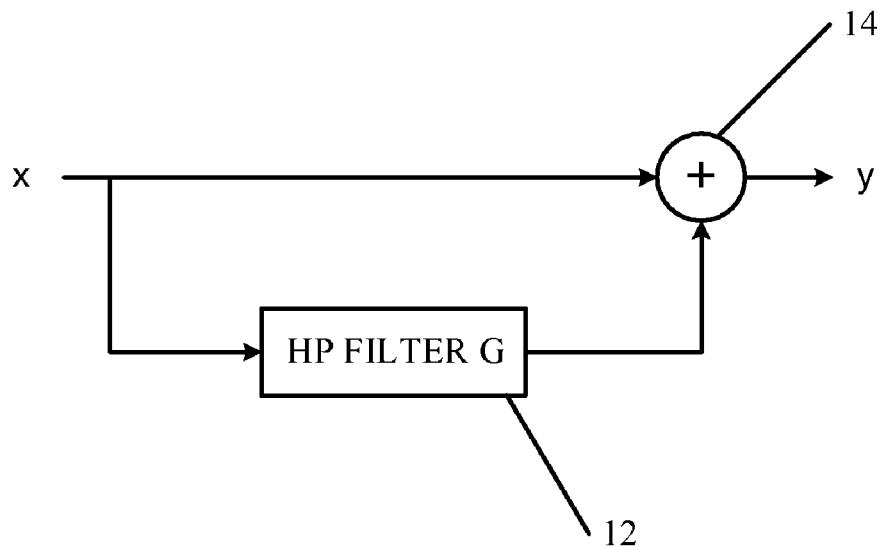
FIG. 1 shows a conventional unsharp masking technology.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs.

FIG. 1 shows a conventional unsharp masking technology 10. In FIG. 1, contour enhancement of an output video signal y is achieved by adding, via adder 14, a high-passed (HP) filtered signal from a linear HP filter 12 to the original video signal x. The equivalent unsharp masking sharpening filter coefficients $\{h_j, -n \leq j \leq n\}$ are shown in equation Eq. (1) as $$\begin{cases} h_0 = 1 + g_0 \\ h_j = g_j, \, j \neq 0 \end{cases} \quad (1)$$

where $\{g_j, -n \leq j \leq n\}$ denote the coefficients of the linear HP filter 12.

Figure 2:
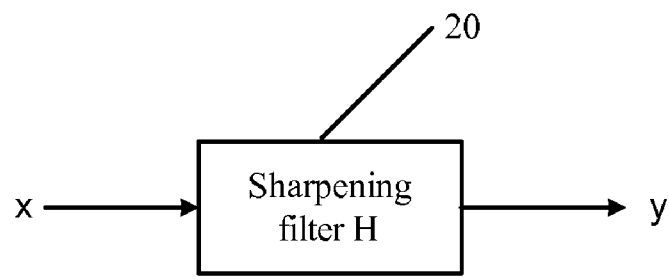
FIG. 2 shows a conventional sharpening filter.

FIG. 2 shows a conventional sharpening filter 20. The sharpening output y is the convolution between the original video signal x and the sharpening filter 20, defined by equation Eq. (2)

$$y_1 = \sum_{j=-n}^{n} h_j x_{1+j}. \quad (2)$$

The techniques described herein may be used for wireless communications, computing, personal electronics, etc. with a built-in camera module. An exemplary use of the techniques for wireless communication is described below.

Figure 3:
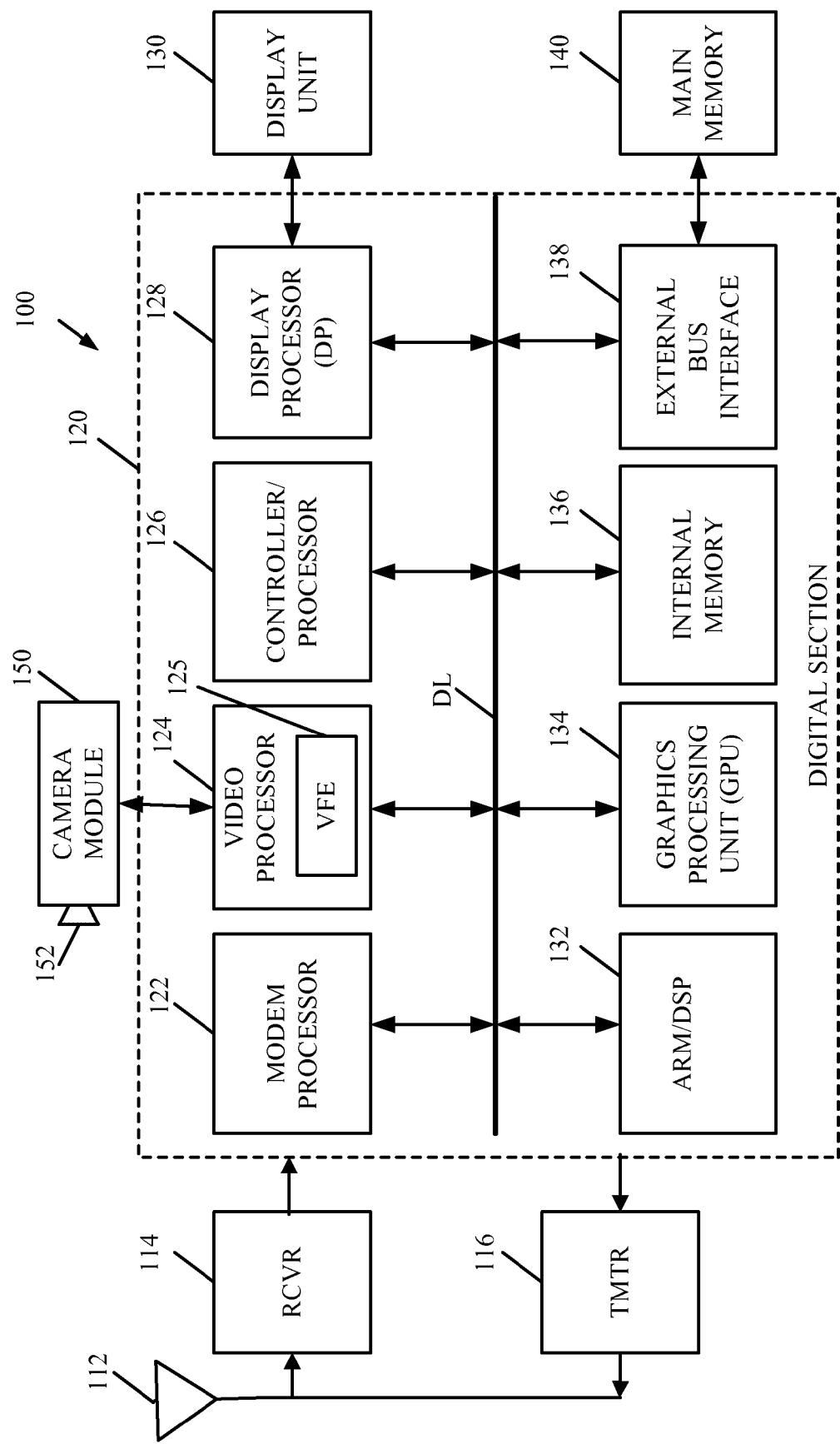
FIG. 3 shows a wireless device.

FIG. 3 shows a configuration of a wireless device 100 for use in a wireless communication system. The wireless device 100 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 100 is capable of providing bi-directional communications via a receive path and a transmit path. On the receive path, signals transmitted by base stations are received by an antenna 112 and provided to a receiver (RCVR) 114. The receiver 114 conditions and digitizes the received signal and provides samples to a digital section 120 for further processing. On the transmit path, a transmitter (TMTR) 116 receives data to be transmitted from the digital section 120, processes and conditions the data, and generates a modulated signal, which is transmitted via the antenna 112 to the base stations.

The digital section 120 includes various processing, interface and memory units such as, for example, a modem processor 122, a video processor 124, a controller/processor 126, a display processor (DP) 128, an ARM/DSP 132, a graphics processing unit (GPU) 134, an internal memory 136, and an external bus interface (EBI) 138. The modem processor 122 performs processing for data transmission and reception (e.g., encoding, modulation, demodulation, and decoding). The video processor 124 performs processing on video content (e.g., still images, moving videos, and moving texts) for video applications such as camcorder, video playback, and video conferencing. The video processor 124 includes a video front end (VFE) 125. The VFE may be a MSM 8600 VFE. The video processor 124 performs processing for a camera module 150 having a lens 152 to create still images and/or moving videos.

The controller/processor 126 may direct the operation of various processing and interface units within the digital section 120. The display processor 128 performs processing to facilitate the display of videos, graphics, and texts on a display unit 130. The ARM/DSP 132 may perform various types of processing for the wireless device 100. The graphics processing unit 134 performs graphics processing of a graphics pipeline.

The techniques described herein may be used for any of the processors in the digital section 120, e.g., the video processor 124. The internal memory 136 stores data and/or instructions for various units within the digital section 120. The EBI 138 facilitates the transfer of data between the digital section 120 (e.g., internal memory 136) and a main memory 140 along a bus or data line DL.

The digital section 120 may be implemented with one or more DSPs, micro-processors, RISCs, etc. The digital section 120 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Combining Sharpening with Scaling

Figure 4A:
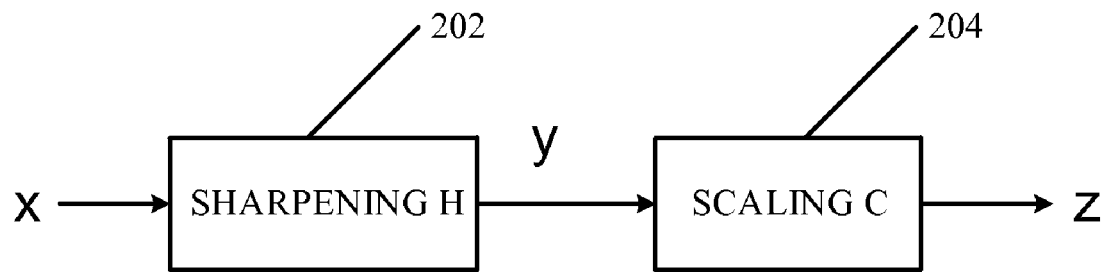
FIG. 4A shows a sharpening filter and a scaling filter.
Figure 4B:
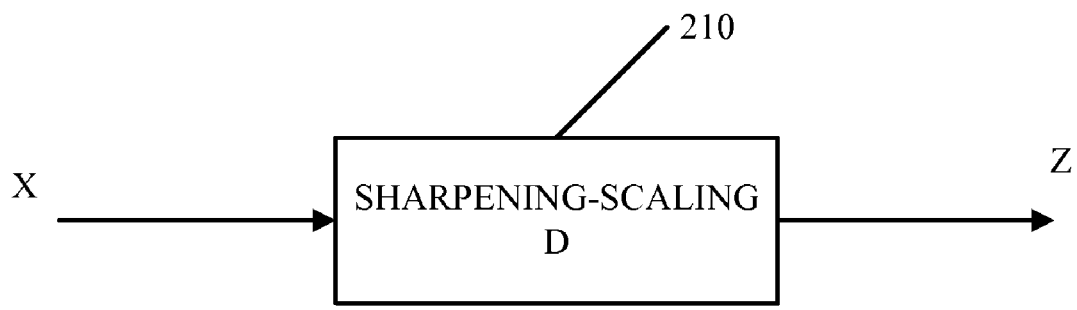
FIG. 4B shows a standalone module with both sharpening and scaling.
Figure 5A:
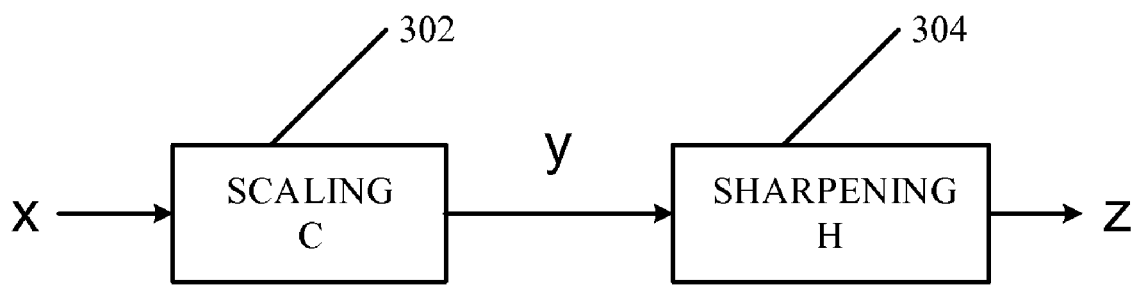
FIG. 5A shows a scaling filter and a sharpening filter.
Figure 5B:
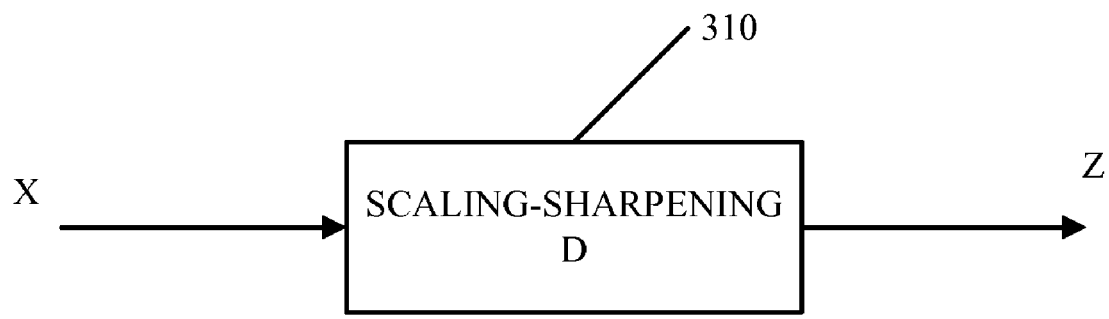
FIG. 5B shows a standalone module with both scaling and sharpening.

FIG. 4A shows a sharpening filter module 202 and a scaling filter module 204. FIG. 4B shows a standalone module 210 with both sharpening and scaling. Sharpening may be implemented as a standalone module in the DP 128. However, to relieve the significant amount of the work (such as design, implementation and testing) brought by a new module, it may be better to combine the sharpening module 202 and the scaling module 204 together and use the existing scaling module to do both scaling and sharpening. There are two possible ways for the combination. The first way is to perform sharpening 202 before the scaling 204, as best seen in FIG. 4A. The second way is shown in FIGS. 5A-5B. In FIG. 5A scaling 302 is performed before sharpening 304. FIG. 5B shows a standalone module 310 with both scaling and sharpening.

Combine Scaling with a Pre-Sharpening Filter

Returning again to FIGS. 4A and 4B, for the first way (combining scaling with a pre-sharpening filter), x, y and z denote the signals before sharpening, after sharpening and after scaling, respectively, and the relationships between y and x as well as z and y are defined in equations Eqs. (3a) and (3b)

$$y_1 = \sum_{j=-n}^{n} h_j x_{1+j}; \quad (3a)$$

and $$z_q = \sum_{i=-1}^{2} c_i y_{\lfloor \frac{q}{s} + i \rfloor} \quad (3b)$$

where $\{c_i, -1 \leq i \leq 2\}$ represent 4-tap finite impulse response (FIR) filter coefficients for scaling; q denotes the coordination index after scaling; s denotes the scaling ratio; and q/s is the coordination index before scaling. Note that the index of y has been scaled by the scaling ratio s since the scaling changes the coordination grid spacing.

Placing equation Eq. (2) into Eq. (3b) modifies the scaling equation into equation Eq. (4):

$$z_q = \sum_{i=-1}^{2} c_i y_{\lfloor \frac{q}{s} \rfloor + i} \quad (4)$$

$$= \sum_{i=-1}^{2} \sum_{j=-n}^{n} c_i h_j x_{\lfloor \frac{q}{s} \rfloor + i + j}$$

$$= \sum_{k=-1-n}^{n+2} f_k x_{\lfloor \frac{q}{s} \rfloor + k}$$

where $$f_k = \sum_{i \in [-1,2], j \in [-n,n], i+j=k} c_i h_j.$$

Since a 4-tap FIR filter is used in the DP 128 for scaling, the above equation needs to be modified in order to fit into current scaling architecture. First, choose n=1, then the Eq. (4) becomes equation Eq. (5)

$$z_q = \sum_{k=-2}^{3} f_k x_{\lfloor \frac{q}{s} \rfloor + k}. \quad (5)$$

Second, remove the weights for $$x_{\lfloor \frac{q}{s} \rfloor - 2} \text{ and } x_{\lfloor \frac{q}{s} \rfloor + 3}.$$

To achieve this, linear predictions are used to predict $$x_{\lfloor \frac{q}{s} \rfloor - 2} \text{ and } x_{\lfloor \frac{q}{s} \rfloor + 3},$$

defined in equations Eq. (6) and Eq. (7)

$$x_{\lfloor \frac{q}{s} \rfloor + 3} = \sum_{i=1}^{4} a_i x_{\lfloor \frac{q}{s} \rfloor + 3 - i}; \quad (6)$$

and $$x_{\lfloor \frac{q}{s} \rfloor - 2} = \sum_{i=1}^{4} b_i x_{\lfloor \frac{q}{s} \rfloor - 2 + i}. \quad (7)$$

Placing equations Eq. (6) and Eq. (7) into equation Eq. (5), the new sharpening-scaling equation Eq. (8) is formed:

$$z_q = \sum_{i=-1}^{2} d_i x_{\lfloor \frac{q}{s} \rfloor + i}. \quad (8)$$

Equation Eq. (8) shows that the scaled sharpened output $z_q$ is obtained by the convolution between the original (pre-sharpened and pre-scaled) signals $$x_{\lfloor \frac{q}{s} \rfloor + i}$$

and a 4-tap sharpening-scaling filter $d_i$ ($-1 \leq i \leq 2$). The coefficients of the new sharpening-scaling filter $\{d_i, -1 \leq i \leq 2\}$ are derived from the original scaling filter coefficients $\{c_i, -1 \leq i \leq 2\}$, sharpening filter coefficients $\{h_i, -1 \leq i \leq 1\}$, forward prediction coefficients $\{a_i, 1 \leq i \leq 4\}$ and backward prediction coefficients $\{b_i, 1 \leq i \leq 4\}$, as described in equation Eq. (9)

$$\begin{bmatrix} d_{-1} \\ d_0 \\ d_1 \\ d_2 \end{bmatrix} = \begin{bmatrix} h_0 + h_{-1}b_1 & h_{-1} & 0 & h_1 a_4 \\ h_1 + h_{-1}b_2 & h_0 & h_{-1} & h_1 a_3 \\ h_{-1}b_3 & h_1 & h_0 & h_{-1} + h_1 a_2 \\ h_{-1}b_4 & 0 & h_1 & h_0 + h_1 a_1 \end{bmatrix} \begin{bmatrix} c_{-1} \\ c_0 \\ c_1 \\ c_2 \end{bmatrix}. \quad (9)$$

Note that the new sharpening-scaling equation (i.e. Eq. (8)) has the same format as the original scaling equation, (i.e. Eq. (3)) but with different coefficients. Therefore, both sharpening and scaling can be done in one shot with the use of the 32-phase polyphase 4-tap FIR scaling module.

Based on Orthogonality Principle, the optimal forward prediction coefficients $\{\hat{a}_i, 1 \leq i \leq 4\}$ are defined by equation Eq. (10) as $$\begin{bmatrix} \hat{a}_1 \\ \hat{a}_2 \\ \hat{a}_3 \\ \hat{a}_4 \end{bmatrix} = \begin{bmatrix} r_0 & r_1 & r_2 & r_3 \\ r_1 & r_0 & r_1 & r_2 \\ r_2 & r_1 & r_0 & r_1 \\ r_3 & r_2 & r_1 & r_0 \end{bmatrix}^{-1} \begin{bmatrix} r_1 \\ r_2 \\ r_3 \\ r_4 \end{bmatrix} \quad (10)$$

where $r_k$ is the autocorrelation value, $r_k = E(x_n x_{n-k})$. Similar equation is used for the optimal backward predictor coefficients $\{\hat{b}_i, 1 \leq i \leq 4\}$.

To further simplify the calculations for $d_i$, choose $$h_{-1} = h_1 = -\frac{\alpha}{256}$$

and $$h_0 + h_{-1} + h_1 = 1.0 \left( h_0 = 1 + \frac{2\alpha}{256} \right).$$

Furthermore, a simple first order approximation, instead of the complicated optimal solution, is used for forward and backward predictions. Then Eq. (9) becomes equation Eq. (11)

$$\begin{bmatrix} d_{-1} \\ d_0 \\ d_1 \\ d_2 \end{bmatrix} = \begin{bmatrix} \frac{\alpha}{256}+1 & \frac{-\alpha}{256} & 0 & 0 \\ \frac{-\alpha}{256} & \frac{2\alpha}{256}+1 & \frac{-\alpha}{256} & 0 \\ 0 & \frac{-\alpha}{256} & \frac{2\alpha}{256}+1 & \frac{-\alpha}{256} \\ 0 & 0 & \frac{-\alpha}{256} & \frac{\alpha}{256}+1 \end{bmatrix} \begin{bmatrix} c_{-1} \\ c_0 \\ c_1 \\ c_2 \end{bmatrix} \quad (11)$$

where the parameter α is called sharpening strength. One sharpening strength yields one set of coefficients {$d_i$}. In this example, $a_2$, $a_3$ and $a_4$ are zero; $b_2$, $b_3$ and $b_4$ are set to zero; and $b_1$ and $a_1$ are set to 1.

Arbitrary scaling in the DP 128 is achieved by the use of a polyphase structure with 32 phases, and each phase has its own set of FIR filter coefficients. Let {$c_{p,i}$, $-1 \leq i \leq 2$} represent the original scaling filter coefficients for phase p, then the new sharpening-scaling filter coefficients for phase p, denoted as {$d_{p,i}$, $-1 \leq i \leq 2$}, are defined by equation Eq. (12) as $$\begin{bmatrix} d_{p,-1} \\ d_{p,0} \\ d_{p,1} \\ d_{p,2} \end{bmatrix} = \begin{bmatrix} \frac{\alpha}{256}+1 & \frac{-\alpha}{256} & 0 & 0 \\ \frac{-\alpha}{256} & \frac{2\alpha}{256}+1 & \frac{-\alpha}{256} & 0 \\ 0 & \frac{-\alpha}{256} & \frac{2\alpha}{256}+1 & \frac{-\alpha}{256} \\ 0 & 0 & \frac{-\alpha}{256} & \frac{\alpha}{256}+1 \end{bmatrix} \begin{bmatrix} c_{p,-1} \\ c_{p,0} \\ c_{p,1} \\ c_{p,2} \end{bmatrix}. \quad (12)$$

Figure 6:
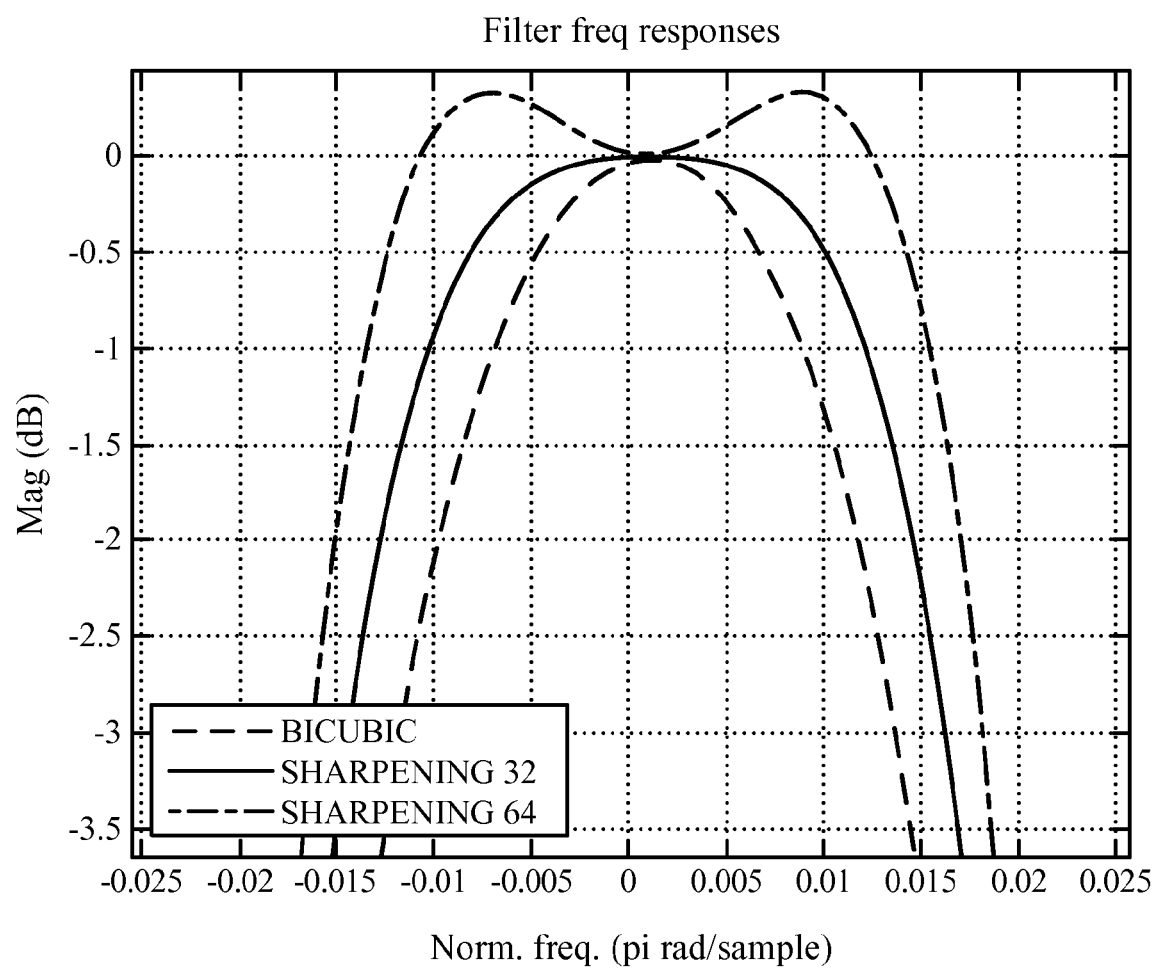
FIG. 6 shows a graph of filter frequency responses for bicubic, sharpening strength=32 and sharpening strength=64.

FIG. 6 shows a graph of filter frequency responses for bicubic, a sharpening strength=32 and a sharpening strength=64. The original polyphase FIR filter coefficients (bicubic scaling) and the new ones (sharpening+bicubic scaling with sharpening strength 32 and 64) are listed in Tables 1, 2 and 3, below. All of them are in Q9 format where Q9 format is the actual floating point value and is the value specified in the tables downshifted by 9 bits (i.e., divide by $2^9$ or 512).

TABLE 1

Polyphase FIR filter coefficients for bicubic scaling

| Phase | $c_{p,-1}$ | $c_{p,0}$ | $c_{p,1}$ | $c_{p,2}$ |
|---|---|---|---|---|
| 0 | 0 | 512 | 0 | 0 |
| 1 | −7 | 510 | 8 | 0 |
| 2 | −14 | 507 | 19 | 0 |
| 3 | −19 | 501 | 32 | −2 |
| 4 | −24 | 493 | 46 | −3 |
| 5 | −28 | 483 | 62 | −5 |
| 6 | −31 | 472 | 78 | −7 |
| 7 | −34 | 458 | 96 | −9 |
| 8 | −36 | 444 | 116 | −12 |
| 9 | −37 | 427 | 135 | −14 |
| 10 | −37 | 410 | 156 | −17 |
| 11 | −37 | 391 | 177 | −19 |
| 12 | −37 | 372 | 199 | −22 |
| 13 | −36 | 352 | 221 | −25 |
| 14 | −35 | 331 | 243 | −27 |
| 15 | −33 | 309 | 265 | −29 |
| 16 | −32 | 288 | 288 | −32 |
| 17 | −29 | 265 | 309 | −33 |
| 18 | −27 | 243 | 331 | −35 |
| 19 | −25 | 221 | 352 | −36 |
| 20 | −22 | 199 | 372 | −37 |
| 21 | −19 | 177 | 391 | −37 |
| 22 | −17 | 156 | 410 | −37 |
| 23 | −14 | 135 | 427 | −37 |
| 24 | −12 | 116 | 444 | −36 |
| 25 | −9 | 96 | 458 | −34 |
| 26 | −7 | 78 | 472 | −31 |
| 27 | −5 | 62 | 483 | −28 |
| 28 | −3 | 46 | 493 | −24 |
| 29 | −2 | 32 | 501 | −19 |
| 30 | 0 | 19 | 507 | −14 |
| 31 | 0 | 8 | 510 | −7 |

TABLE 2

Polyphase FIR filter coefficients for sharpening + scaling (sharpening strength α = 32)

| Phase | $d_{p,-1}$ | $d_{p,0}$ | $d_{p,1}$ | $d_{p,2}$ |
|---|---|---|---|---|
| 0 | −64 | 640 | −64 | 0 |
| 1 | −72 | 638 | −52 | −1 |
| 2 | −79 | 633 | −38 | −3 |
| 3 | −84 | 625 | −21 | −6 |
| 4 | −89 | 614 | −3 | −9 |
| 5 | −92 | 600 | 17 | −13 |
| 6 | −94 | 584 | 40 | −18 |
| 7 | −95 | 565 | 65 | −22 |
| 8 | −96 | 545 | 91 | −28 |
| 9 | −95 | 522 | 118 | −33 |
| 10 | −93 | 498 | 146 | −38 |
| 11 | −91 | 472 | 175 | −44 |
| 12 | −88 | 445 | 205 | −50 |
| 13 | −85 | 417 | 235 | −55 |
| 14 | −81 | 388 | 266 | −61 |
| 15 | −76 | 358 | 297 | −66 |
| 16 | −72 | 328 | 328 | −72 |
| 17 | −66 | 297 | 358 | −76 |
| 18 | −61 | 266 | 388 | −81 |
| 19 | −55 | 235 | 417 | −85 |
| 20 | −50 | 205 | 445 | −88 |
| 21 | −44 | 175 | 472 | −91 |
| 22 | −38 | 146 | 498 | −93 |
| 23 | −33 | 118 | 522 | −95 |
| 24 | −28 | 91 | 545 | −96 |
| 25 | −22 | 65 | 565 | −95 |
| 26 | −18 | 40 | 584 | −94 |
| 27 | −13 | 17 | 600 | −92 |
| 28 | −9 | −3 | 614 | −89 |
| 29 | −6 | −21 | 625 | −84 |
| 30 | −3 | −38 | 633 | −79 |
| 31 | −1 | −52 | 638 | −72 |

TABLE 3

Polyphase FIR filter coefficients for sharpening + scaling (sharpening strength α = 64).

| Phase | $d_{p,-1}$ | $d_{p,0}$ | $d_{p,1}$ | $d_{p,2}$ |
|---|---|---|---|---|
| 0 | −128 | 768 | −128 | 0 |
| 1 | −137 | 765 | −114 | −2 |
| 2 | −144 | 759 | −96 | −6 |
| 3 | −149 | 748 | −76 | −10 |
| 4 | −154 | 734 | −52 | −16 |
| 5 | −156 | 717 | −26 | −22 |
| 6 | −157 | 696 | 2 | −28 |
| 7 | −157 | 672 | 33 | −36 |
| 8 | −156 | 646 | 66 | −44 |
| 9 | −153 | 617 | 100 | −52 |
| 10 | −149 | 585 | 136 | −60 |
| 11 | −145 | 552 | 173 | −69 |
| 12 | −140 | 518 | 211 | −78 |
| 13 | −133 | 482 | 250 | −86 |
| 14 | −127 | 444 | 289 | −95 |
| 15 | −119 | 406 | 328 | −103 |
| 16 | −112 | 368 | 368 | −112 |
| 17 | −103 | 328 | 406 | −119 |
| 18 | −95 | 289 | 444 | −127 |
| 19 | −86 | 250 | 482 | −133 |
| 20 | −78 | 211 | 518 | −140 |
| 21 | −69 | 173 | 552 | −145 |
| 22 | −60 | 136 | 585 | −149 |
| 23 | −52 | 100 | 617 | −153 |
| 24 | −44 | 66 | 646 | −156 |
| 25 | −36 | 33 | 672 | −157 |
| 26 | −28 | 2 | 696 | −157 |
| 27 | −22 | −26 | 717 | −156 |
| 28 | −16 | −52 | 734 | −154 |
| 29 | −10 | −76 | 748 | −149 |
| 30 | −6 | −96 | 759 | −144 |
| 31 | −2 | −114 | 765 | −137 |

Combine Scaling with a Post-Sharpening Filter

Referring back to FIGS. 5A-5B, in the second way (combining scaling with a post-sharpening filters) x, y and z denote the signals before scaling, after scaling and after sharpening, respectively, and the x-y relationships and y-z relationship are expressed as in equations Eqs. (13) and (14)

$$y_1 = \sum_{j=-1}^{2} c_j x_{\lfloor \frac{1}{s} \rfloor + j} \tag{13}$$

$$z_q = \sum_{i=-n}^{n} h_j y_{q+i} \tag{14}$$

where s represents the scaling ratio. Placing Eq. (13) into Eq. (14) achieves equation Eq. (15)

$$\begin{aligned} z_q &= \sum_{i=-n}^{n} h_j y_{q+i} \\ &= \sum_{i=-n}^{n} \sum_{j=-1}^{2} h_i c_j x_{\lfloor \frac{q}{s} \rfloor + i + j} \\ &= \sum_{i=-\frac{n}{s}}^{\frac{n}{s}} \sum_{j=-1}^{2} h_{si} c_j x_{\lfloor \frac{q}{s} \rfloor + i + j} \\ &= \sum_{k=-\frac{n}{s}-1}^{\frac{n}{s}+2} f_k(s) x_{\lfloor \frac{q}{s} \rfloor + k} \end{aligned} \tag{15}$$

where $$f_k(s) = \sum_{i \in [-\frac{n}{s}, \frac{n}{s}], j \in [-1,2], si+j=k} h_{si} c_j \text{ and}$$

where n is the number of the sharpening filter taps.

Since sharpening is placed after scaling, the coordination grid spacing for the sharpening input has been changed. This increases the implementation difficulty. Moreover, since $f_k(s)$ is a function of the scaling ratio s, a different scaling ratio yields different set of coefficients. Therefore, infinity sets of coefficients are required in order to support arbitrary scaling, which is essentially prohibitive.

Sharpening Strength Adjustment

Sharpening strength is determined by a user's preference and coding parameters. The user's preference is decided by the user.

Adjusting sharpening strength adaptively according to coding parameters is a mechanism to prevent the unwanted enhancement on annoying coding artifacts. The sharpening strength α is reduced by a certain value if QP is greater than a threshold (since coding artifact is proportional to QP), i.e., shown in equation Eq. (16) as $$\alpha = \max(\alpha_0 - k(\max(0, Qp - \tau)), \alpha_{min}) \tag{16}$$

where $\alpha_{min}$ is the minimum sharpening strength; τ is a threshold determined by the distance to the last I frame and codec type; k is a tunable constant; Qp is a quantization step size; and $\alpha_0$ is a default sharpening strength. A smaller τ is set for I frames and frames closer to the I frames, while a larger τ is set for frames far away from the I frames. The threshold τ is also affected by codec type. A larger τ is set for a codec with in-loop deblocker or post deblocker/smoothing filter, while a smaller τ is set for a codec without deblocker or any other modules to remove coding artifacts.

HW Changes and HW Interface for New DPs

To implement the sharpening function properly, the following two changes are suggested to be made on FIR filters for new DP designs. First, increase the number of bits for the filter coefficients from s10 to s11 (in Q9 format). A signed ten-bit resolution (s10) is sufficient for performing scaling, but not sufficient enough for performing both scaling and sharpening. Taking phase 0 as an example, the FIR filter coefficients are [−2α, 512+4α, −2α, 0], but an overflow problem occurs even at a sharpening strength α=1. To address this problem, the number of bits for the filter coefficients needs to be increased.

Figure 7:
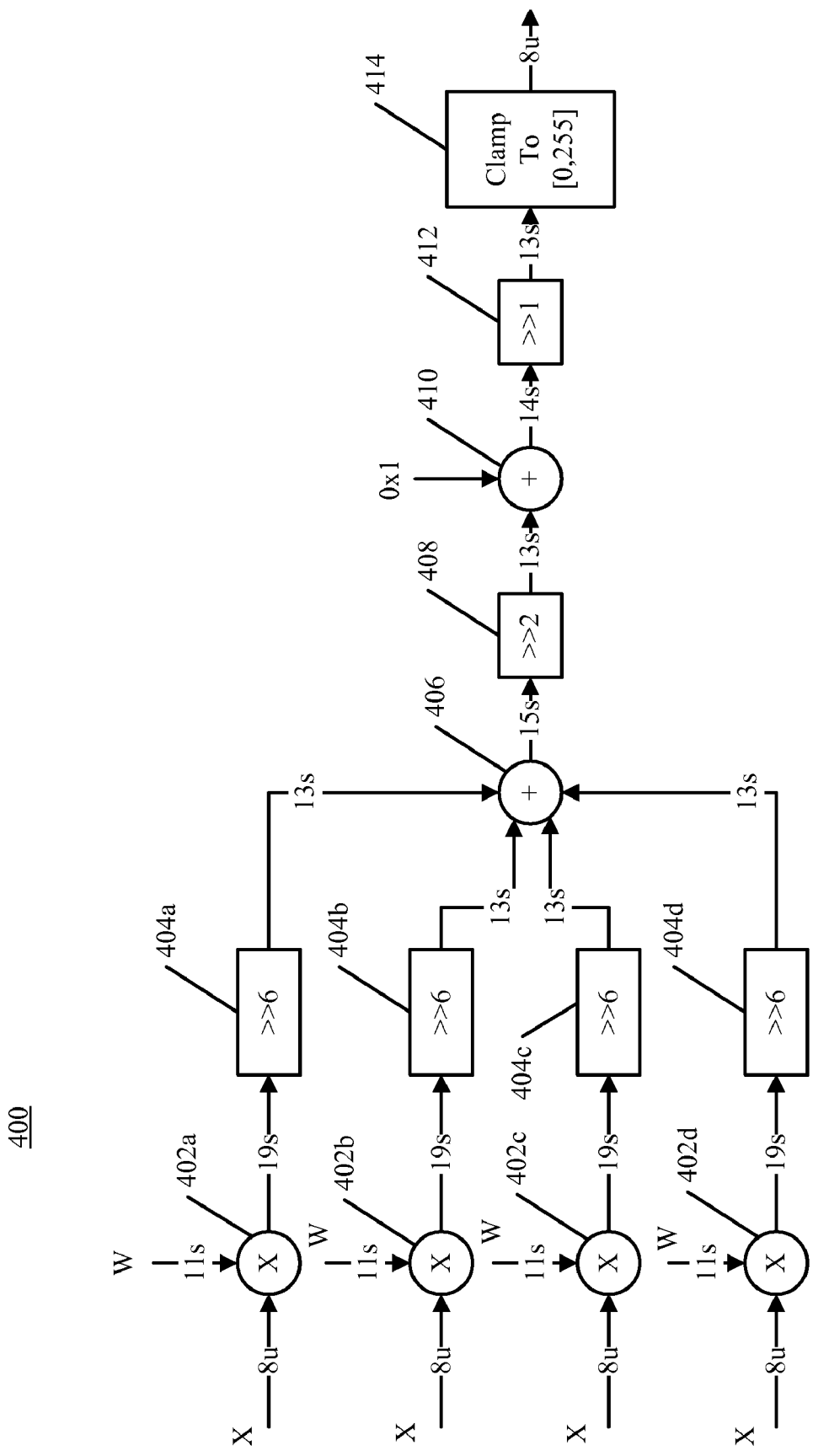
FIG. 7 shows a modified 4-tap finite impulse response (FIR) filter circuit for both sharpening and scaling.

FIG. 7 shows a modified 4-tap FIR filter circuit 400 for both sharpening and scaling. A signed eleven-bit resolution (s11) is sufficient for sharpening strength up to 127. It should be noted, that s11 or 11s represents a signed 11 bits resolution meaning 1 bit to denote a +/− sign and 10 bits for the magnitude. However, unsigned bit resolutions are denoted for example as u8. In this instance, the 8 represents the number of bits for the magnitude with no bits for a sign. This nomenclature applies throughout the disclosure and drawings. There are four input video signals X, each with 8 bits which are multiplied with W (11s bits) at multiplier 402a. The W represents the sharpening-scaling filter coefficients. The resultant signal is 19 bits (19s). The output of the multiplier 402a is downshifted bitwise by 6 (>>6) at block 404a. In other words, the block 404a divides the input by $2^6$. The resultant output signal is 13 bits (13s).

The output of block 404a is sent to adder 406. The modified 4-tap FIR filter circuit 400 includes four parallel paths. The first path includes the multiplier 402a and downshifter 404a. The second path includes a multiplier 402b and downshifter 404b. The third path includes a multiplier 402c and downshifter 404c. The fourth path includes a multiplier 402d and downshifter 404d. The first through fourth paths function essentially the same. Thus, adder 406 receives the output from downshifters 404a, 404b, 404c and 404d.

The output of adder 406 is sent to block 408 where downshifting bitwise by 2 (>>2) takes place. The output of adder 406 is 15 bits (15s). When the output of adder 406 is divided by $2^2$, the resultant output is 13 bits (13s). The output of downshifter 408 is sent to adder 410 where a 1 bit matrix is added. Thus, the resultant output is now 14 bits (14s). The output of the adder 410 is sent to downshifter block 412 to perform a downshift bitwise by 1 or divide by $2^1$. The resultant output is now 13 bits (13s). The output of the downshifter block 412 is sent to block 414 where the output is clamped to values between [0, 255]. The resultant output is an eight bit signal (8u).

Separate sets of coefficients for luminance and chrominance are suggested. The original scaling design uses the same set of coefficients for both luminance and chrominance. It may not be the best choice for sharpening-scaling module since the sharpening enhancement should be applied only on the luminance component. In the exemplary embodiment, the luminance should use a set of coefficients that are different from the ones for the chrominance. For instance, at sharpening strength α=32, the coefficient set listed in the Table 2 is used for luminance, while the coefficient set listed in the Table 1 is used for chrominance. In one configuration, sharpening is not applied on chrominance so the original scaling filter coefficients listed in the Table 1 {C} are used for chrominance (i.e., only doing scaling no sharpening). The new sharpening-scaling coefficients listed in the Table 2 {D} are used for luminance (i.e., doing both sharpening and scaling). The value W in FIG. 7 is equal to {D} for luminance and {C} for chrominance.

In addition to the above two changes, a new sub-module to calculate the sharpening-scaling filter coefficients is introduced here.

Figure 8:
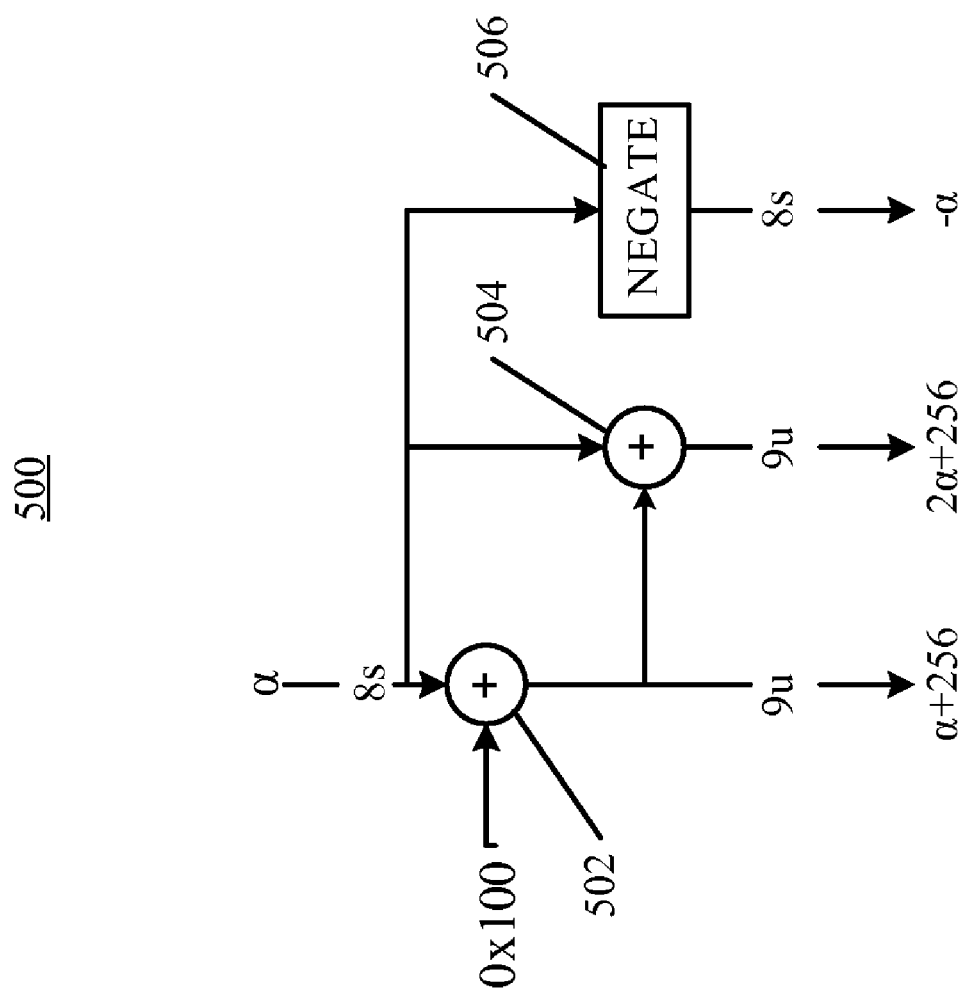
FIG. 8 shows an integrated circuit for calculating the values for the 4×4 matrix of equation Eq. (17).
Figure 9A:
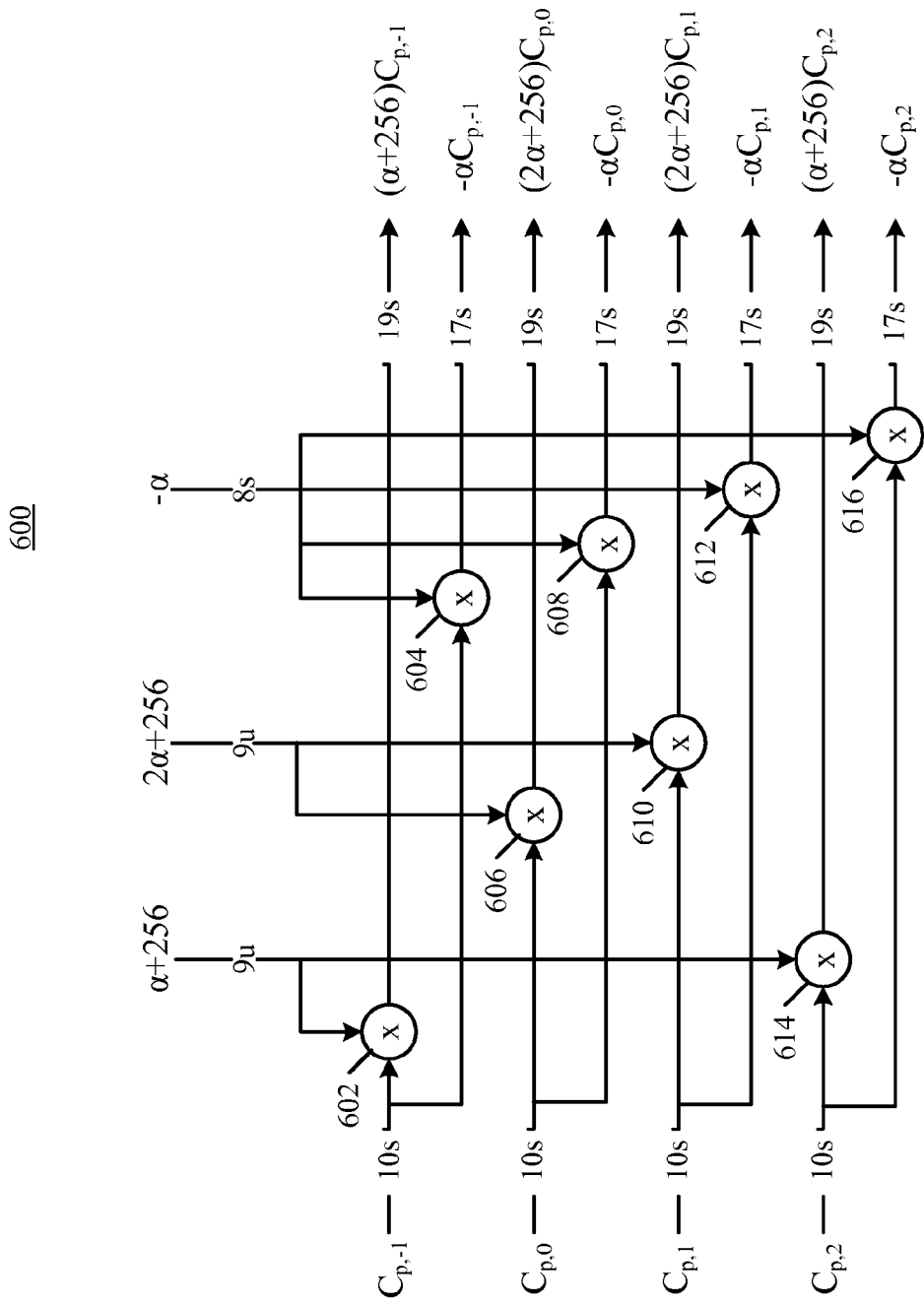
FIGS. 9A and 9B show an integrated circuit for calculating equation Eq. (17).
Figure 9B:
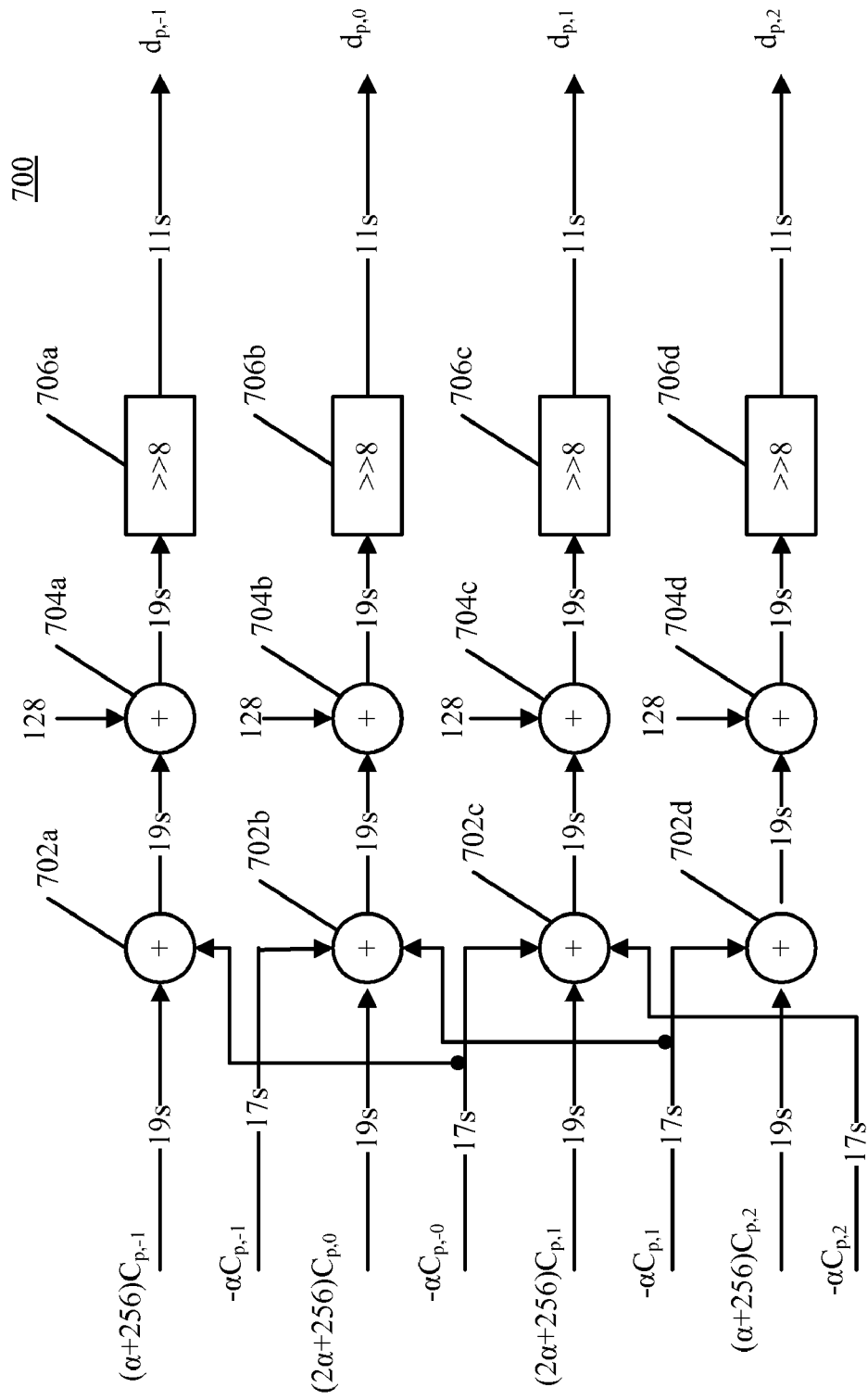

The coefficients $\{c_{p,k}, -1 \leq k \leq 2\}$ in Eq. (12) are in Q9 format and the sharpening strength $\alpha$ is in the range of [−127, 127]. Thus, Eq. (12) may be rewritten as equation Eq. (17)

$$\left( \begin{bmatrix} d_{p,-1} \\ d_{p,0} \\ d_{p,1} \\ d_{p,2} \end{bmatrix} = \begin{bmatrix} \alpha+256 & -\alpha & 0 & 0 \\ -\alpha & 2\alpha+256 & -\alpha & 0 \\ 0 & -\alpha & 2\alpha+256 & -\alpha \\ 0 & 0 & -\alpha & \alpha+256 \end{bmatrix} \begin{bmatrix} c_{p,-1} \\ c_{p,0} \\ c_{p,1} \\ c_{p,2} \end{bmatrix} + \begin{bmatrix} 128 \\ 128 \\ 128 \\ 128 \end{bmatrix} \right) >> 8 \quad (17)$$

where the hardware implementation of above equation is illustrated in FIGS. 8, 9A and 9B.

FIG. 8 shows an integrated circuit 500 for calculating the values for the 4×4 matrix of equation Eq. (17). The integrated circuit 500 includes an adder 502 which receives the value for the sharpening strength $\alpha$ and a value 256 denoted by [0×100]. This produces a first resultant output of $\alpha+256$. The sharpening strength $\alpha$ in input to the adder 502, an adder 504 and a negate block 506. Then each of the adder 502, adder 504 and negate block 506 produce an output. Thus, there are three outputs.

The adder 504 receives as input the sharpening strength $\alpha$ and the output of adder 502. This produces second resultant output $2\alpha+256$. The sharpening strength at the output of block 506 is $-\alpha$, the third resultant output. In the exemplary embodiment, the first and second resultant outputs from circuit 500 are 9 bits (9u) while the third resultant output is 8 bits (8s).

FIGS. 9A and 9B show an integrated circuit for calculating equation Eq. (17). The integrated circuit is divided into two sub-circuits 600 and 700.

The sub-circuit 600 calculates the product of the 4-tap FIR filter coefficients for scaling denoted as $\{c_i, -1 \leq i \leq 2\}$ and the 4×4 matrix of equation Eq. (17). There are four paths for inputting the FIR filter coefficients, $C_{p,-1}, C_{p,0}, C_{p,1}$ and $C_{p,2}$. The FIR filter coefficients, $C_{p,-1}, C_{p,0}, C_{p,1}$ and $C_{p,2}$ are 10 bits (10s). Each path has a multiplier 602, 606, 610 and 614. The multiplier 602 receives the input coefficient $C_{p,-1}$ and the first resultant output of integrated circuit 500, $\alpha+256$. Likewise, the multiplier 614 receives the input coefficient $C_{p,2}$ and the first resultant output of integrated circuit 500, $\alpha+256$.

The multiplier 606 receives the input coefficient $C_{p,0}$ and the second resultant output of integrated circuit 500, $2\alpha+256$. Likewise, the multiplier 610 receives the input coefficient $C_{p,1}$ and the second resultant output of integrated circuit 500, $2\alpha+256$.

Each of the four paths for inputting the FIR filter coefficients $C_{p,-1}, C_{p,0}, C_{p,1}$ and $C_{p,2}$ has a parallel branch path. Thus, the parallel branch path for $C_{p,-1}$ has multiplier 604 which multiplies $C_{p,-1}$ and the third resultant output of the integrated circuit 500, $-\alpha$. The parallel branch path for $C_{p,0}$ has multiplier 608 which multiplies $C_{p,0}$ and the third resultant output of the integrated circuit 500, $-\alpha$. The parallel branch path for $C_{p,1}$ has multiplier 612 which multiplies $C_{p,1}$ and the third resultant output of the integrated circuit 500, $-\alpha$. The parallel branch path for $C_{p,2}$ has multiplier 616 which multiplies $C_{p,2}$ and the third resultant output of the integrated circuit 500, $-\alpha$.

The first and second resultant outputs of sub-circuit 600 include $(\alpha+256)C_{p,-1}$ and $-\alpha C_{p,-1}$ from multipliers 602 and 604, respectively. The third and fourth resultant outputs of multipliers 606 and 608 include $(2\alpha+256)C_{p,0}$ and $-\alpha C_{p,0}$, respectively. The fifth and sixth resultant outputs of multipliers 610 and 612 include $(2\alpha+256)C_{p,2}$ and $-\alpha C_{p,2}$, respectively. The seventh and eighth resultant outputs of multipliers 614 and 616 include $(\alpha+256)C_{p,2}$ and $-\alpha C_{p,2}$. These resultant outputs are inputs to sub-circuit 700 of FIG. 9B. The first, third, fifth, and seventh resultant outputs are 19 bits (19s). The second, fourth, sixth and eighth resultant outputs are 17 bits (17s).

The sub-circuit 700 calculates the remaining operation of equation Eq. (17) using the inputs from sub-circuit 600. The sub-circuit 700 includes four adders 702a, 702b, 702c and 702d. The adder 702a adds together the first resultant output $(\alpha+256)C_{p,-1}$ and the fourth resultant output $-\alpha C_{p,0}$ which produces an output. The output of adder 702a is sent to adder 704a. The adder 704a adds the output from adder 702a and a value of 128. The output of adder 704a is sent to a downshifter 706a where it is downshifted bitwise by 8 (>>8). For example, the downshifter 706a equivalently serves to divide the signal by $2^8$ and produces $d_{p,-1}$.

The adder 702b adds together the second resultant output $-\alpha C_{p,-1}$, the third resultant output $(2\alpha+256)C_{p,0}$ and the sixth resultant output $-\alpha C_{p,1}$ which produces an output. The output of adder 702b is sent to adder 704b. The adder 704b adds the output from adder 702b and a value of 128. The output of adder 704b is sent to a downshifter 706b where it is downshifted bitwise by 8 (>>8). For example, the downshifter 706a equivalently serves to divide the signal by $2^8$ and produces $d_{p,0}$.

The adder 702c adds together the fourth resultant output $-\alpha C_{p,0}$, the fifth resultant output $(2\alpha+256)C_{p,1}$ and the eighth resultant output $-\alpha C_{p,2}$ which produces an output. The output of adder 702c is sent to adder 704c. The adder 704c adds the output from adder 702c and a value of 128. The output of adder 704c is sent to a downshifter 706c where it is downshifted bitwise by 8 (>>8) and produces $d_{p,1}$.

The adder 702d adds together the sixth resultant output $-\alpha C_{p,1}$ and the seventh resultant output $(\alpha+256)C_{p,2}$ which produces an output. The output of adder 702d is sent to adder 704d. The adder 704d adds the output from adder 702d and a value of 128. The output of adder 704d is sent to a downshifter 706d where it is downshifted bitwise by 8 (>>8) and produces $d_{p,2}$.

Figure 10:
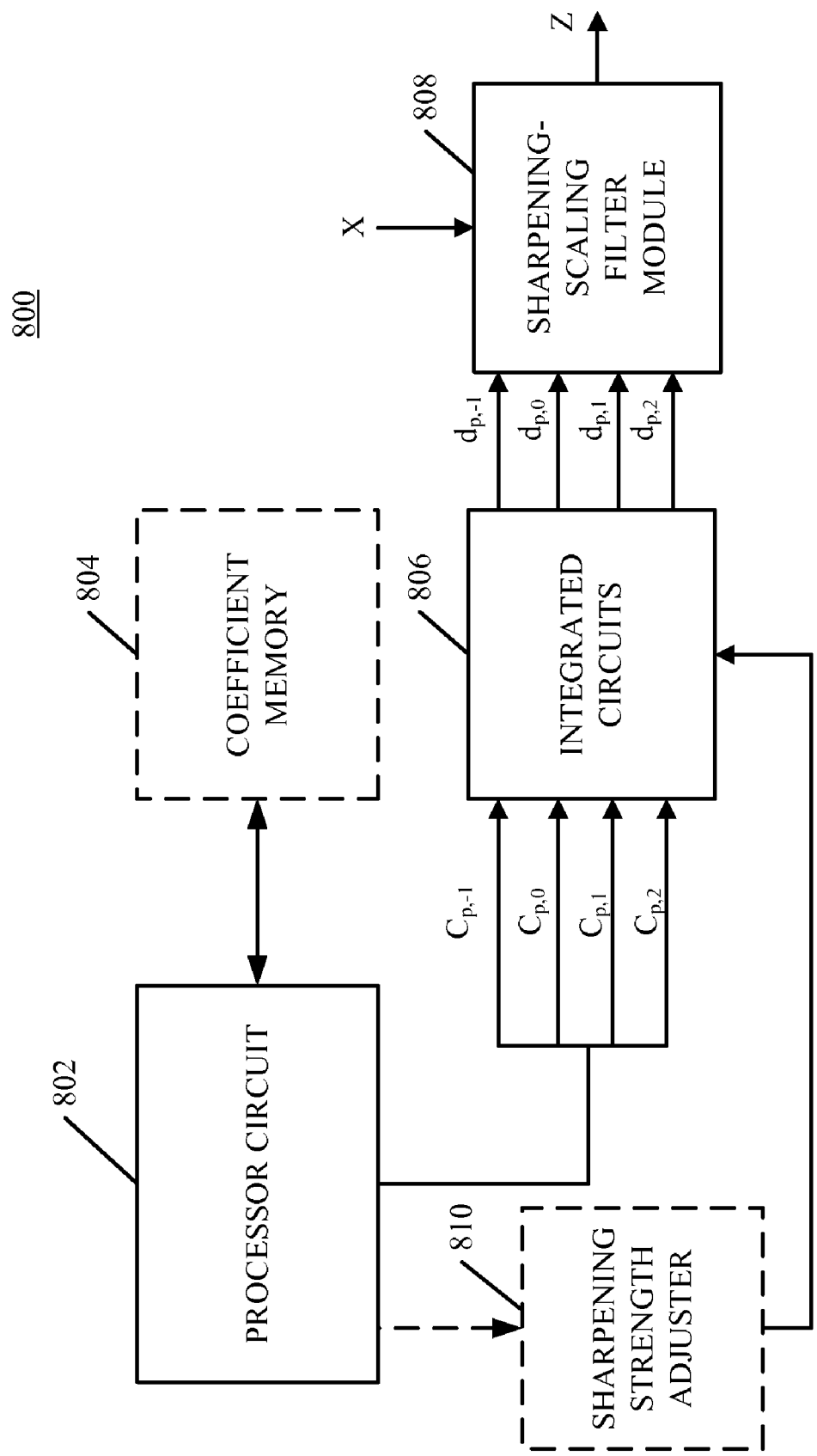
FIG. 10 shows a block diagram for processing a video signal with a standalone sharpening-scaling filter module.

FIG. 10 shows block diagram 800 for processing a video signal with a standalone sharpening-scaling filter module 808 in a DP 128. The block diagram 800 includes a processor circuit 802 which communicates with a coefficient memory 804. The coefficient memory 804 may store the values of the FIR filter coefficients $C_{p,-1}$, $C_{p,0}$, $C_{p,1}$ and $C_{p,2}$. The FIR filter coefficients $C_{p,-1}$, $C_{p,0}$, $C_{p,1}$ and $C_{p,2}$ are read from the coefficient memory 804 and sent to the integrated circuits at block 806. The integrated circuits include circuit 500 and sub-circuits 600 and 700. The output of the integrated circuits at block 806 are the new sharpening-scaling filter coefficients for phase p, denoted as $\{d_{p,i}, -1 \leq i \leq 2\}$ and are 11 bits. The 11-bit new sharpening-scaling filter coefficients $\{d_{p,i}, -1 \leq i \leq 2\}$ are applied to the sharpening-scaling filter module 808 to generate output Z from the original video signal X.

The block diagram 800 also shows a sharpening strength adjuster 810 to adaptively adjust the sharpening strength $\alpha$ to prevent unwanted enhancement on artifacts. The adaptive adjustment employs equation Eq. (16) above.

As can be appreciated, the equations described herein may be carried out by a processor or a combination of software and hardware. Furthermore, the sharpening strength adjuster 810 is shown in a dotted line box to denote that the sharpening strength adjuster 810 may be outside of the DP 128. For example, the sharpening strength adjuster 810 may be in the video processor 124. Likewise, the coefficient memory 804 is shown in a dotted line box to denote that the coefficient memory 804 may be external to the DP 128.

Only one sharpening parameter is defined in the table below. Note that many parameters used in the sharpening-scaling filter module 808, such as scaling coefficients for a FIR, have already been defined above. Table 4 illustrates a Hardware interface table with the sharpening strength $\alpha$. This can be an input into the integrated circuit 500 of FIG. 8.

TABLE 4

Hardware interface

| Name | Bits | Description and Value range | Programming Frequency |
|------|------|------------------------------|-----------------------|
| sharpening_strength | S8 | Sharpening strength $\alpha$, [−127, 127] | Occasionally (change due to users' preference or QPs) |

Sharpening Implementation

Since the hardware (HW) changes cannot be made for some existing DPs, the overflow problem can be overcome with downshifting the FIR filter coefficients $C_{p,-1}$, $C_{p,0}$, $C_{p,1}$ and $C_{p,2}$ by 1 bit and then compensating back by gamma correction. Downshifting coefficients by 1-bit is equivalent to represent a Q8 value ($2^8$) in signed 10 bit resolution. Since the FIR filter coefficients, $C_{p,-1}$, $C_{p,0}$, $C_{p,1}$ and $C_{p,2}$ are divided by two, the new RGB values, after sharpening and scaling, would be only a half of the values it is supposed to be. These values by the gamma correction (gc) are mapped values stored in the column "Original Mapped Value." Each Original Mapped Value entry in the Look-up Table (LUT) (Table 5) has a new mapped value corresponding to the original mapped value multiplied by two. An example of the new LUT is listed in Table 5.

In existing DPs, scaling is performed after CSC, so the pixels processed by the scaling module are in RGB space rather than in YCbCr space. This make "separate sets of coefficients for luminance and chrominance" less attractive.

The calculation for the new sharpening-scaling filter coefficients need to be done in software (SW) since there is no integrated circuit (HW) in the existing DPs for it.

TABLE 5

New LUT to Compensate for overflow

| Original Mapped value | New mapped value |
|-----------------------|------------------|
| 0 | $gc_0$ | Max(255, 2 * $gc_0$) |
| 1 | $gc_1$ | Max(255, 2 * $gc_1$) |
| 2 | $gc_2$ | Max(255, 2 * $gc_2$) |
| ... | | |
| 255 | $gc_{255}$ | Max(255, 2 * $gc_{255}$) |

Extend to m-Tap Filter

The finite impulse response (FIR) filter taps of the sharpening-scaling filter module may be increased. The sharpening-scaling filter module should be ready to adopt changes. Specifically, let m be the number of the taps for the FIR filter (suppose m is an even number), then the equations Eq. (2), (3), and (8) are modified accordingly, as equations Eqs. (18), (19) and (20)

$$y_l = \sum_{j=-\frac{m}{2}+1}^{\frac{m}{2}-1} h_j x_{l+j} \quad (18)$$

$$z_q = \sum_{i=-\frac{m}{2}+1}^{\frac{m}{2}} c_i y_{\lfloor \frac{q}{s} \rfloor + i} \quad (19)$$

$$z_q = \sum_{i=-\frac{m}{2}+1}^{\frac{m}{2}} d_i x_{\lfloor \frac{q}{s} \rfloor + i}. \quad (20)$$

The relationship between the new sharpening-scaling filter coefficients $$\left\{ d_i, -\frac{m}{2} + 1 \leq i \leq \frac{m}{2} \right\}$$

and the original scaling filter coefficients $$\left\{ c_i, -\frac{m}{2} + 1 \leq i \leq \frac{m}{2} \right\}$$

is shown in equation Eq. (21)

$$\begin{bmatrix} d_{-\frac{m}{2}+1} \\ d_{-\frac{m}{2}+2} \\ d_{-\frac{m}{2}+3} \\ \vdots \\ \vdots \\ d_0 \\ d_1 \\ \vdots \\ \vdots \\ d_{\frac{m}{2}} \end{bmatrix} = \begin{bmatrix} h_0+h_{-1} & h_{-1} & h_{-2} & \cdots & \cdots & h_{-\frac{m}{2}+1} & 0 & \cdots & \cdots & 0 \\ h_1 & h_0 & h_{-1} & \cdots & \cdots & h_{-\frac{m}{2}+2} & h_{-\frac{m}{2}+1} & \cdots & \cdots & 0 \\ h_2 & h_1 & h_0 & \cdots & \cdots & h_{-\frac{m}{2}+3} & h_{-\frac{m}{2}+2} & \cdots & \cdots & 0 \\ \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots \\ h_{\frac{m}{2}-1} & h_{\frac{m}{2}-2} & h_{\frac{m}{2}-3} & \cdots & \cdots & h_0 & h_{-1} & \cdots & \cdots & 0 \\ 0 & h_{\frac{m}{2}-1} & h_{\frac{m}{2}-2} & \cdots & \cdots & h_1 & h_0 & \cdots & \cdots & h_{-\frac{m}{2}+1} \\ \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots \\ 0 & 0 & 0 & \cdots & \cdots & 0 & h_{\frac{m}{2}-1} & \cdots & \cdots & h_0+h_1 \end{bmatrix} \begin{bmatrix} c_{-\frac{m}{2}+1} \\ c_{-\frac{m}{2}+2} \\ c_{-\frac{m}{2}+3} \\ \vdots \\ \vdots \\ c_0 \\ c_1 \\ \vdots \\ \vdots \\ c_{\frac{m}{2}} \end{bmatrix} \quad (21)$$

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A device comprising:
   a single scaling filter to filter a video signal once to perform both sharpening and scaling;
   a memory to store original scaling filter coefficients for the scaling filter; and
   an integrated circuit to calculate new sharpening-scaling filter coefficients derived from the original scaling filter coefficients and one of sharpening filter coefficients for a sharpening filter and a sharpening strength and to apply the new sharpening-scaling filter coefficients to the single scaling filter;
   wherein the single scaling filter filters the video signal according to $$z_q = \sum_{i=-\frac{m}{2}+1}^{\frac{m}{2}} d_i x_{\lfloor \frac{q}{s} \rfloor + i}$$

where x is the video signal; $d_i$ are the new sharpening-scaling filter coefficients; m denotes an even number of taps; s denotes the scaling ratio; q denotes a coordination index after scaling; and i is an index for a tap of the single scaling filter.

2. The device of claim 1, wherein the single scaling filter comprises a polyphase m-tap finite impulse response (FIR) scaling filter.

3. The device of claim 2, wherein the new sharpening-scaling filter coefficients are derived according to $$\begin{bmatrix} d_{-1} \\ d_0 \\ d_1 \\ d_2 \end{bmatrix} = \begin{bmatrix} h_0+h_{-1}b_1 & h_{-1} & 0 & h_1 a_4 \\ h_1+h_{-1}b_2 & h_0 & h_{-1} & h_1 a_3 \\ h_{-1}b_3 & h_1 & h_0 & h_{-1}+h_1 a_2 \\ h_{-1}b_4 & 0 & h_1 & h_0+h_1 a_1 \end{bmatrix} \begin{bmatrix} c_{-1} \\ c_0 \\ c_1 \\ c_2 \end{bmatrix}$$

where $d_i$, $-1 \leq i \leq 2$, are the new sharpening-scaling filter coefficients; $c_i$, $-1 \leq i \leq 2$, are the original scaling filter coefficients; $h_i$, $-1 \leq i \leq 1$, are the sharpening filter coefficients; $a_i$, $1 \leq i \leq 4$, are forward prediction coefficients; and $b_i$, $1 \leq i \leq 4$, are backward prediction coefficients.

4. The device of claim 3, wherein the polyphase m-tap finite impulse response (FIR) scaling filter has a plurality of phases.

5. The device of claim 4, wherein the new sharpening-scaling filter coefficients are calculated according to a first order approximation of $$\begin{bmatrix} d_{p,-1} \\ d_{p,0} \\ d_{p,1} \\ d_{p,2} \end{bmatrix} =$$

-continued $$\left(\begin{bmatrix} \alpha+256 & -\alpha & 0 & 0 \\ -\alpha & 2\alpha+256 & -\alpha & 0 \\ 0 & -\alpha & 2\alpha+256 & -\alpha \\ 0 & 0 & -\alpha & \alpha+256 \end{bmatrix}\begin{bmatrix} c_{p,-1} \\ c_{p,0} \\ c_{p,1} \\ c_{p,2} \end{bmatrix} + \begin{bmatrix} 128 \\ 128 \\ 128 \\ 128 \end{bmatrix}\right) >> 8$$

where $$h_{-1} = h_1 = -\frac{\alpha}{256}*(256)$$

and $$h_0 + h_{-1} + h_1 = 1.0 \left(h_0 = 1 + \frac{2\alpha}{256}\right)*256$$

where $\alpha$ is the sharpening strength in a range of $-127$-$+127$; $a_2$, $a_3$ and $a_4$ are set to zero; $b_2$, $b_3$ and $b_4$ are set to zero; $b_1$ and $a_1$ are set to 1; $c_{p,i}$, $-1 \leq i \leq 2$, represent the original scaling filter coefficients for a phase p; and $d_{p,i}$, $-1 \leq i \leq 2$, represent the new sharpening-scaling filter coefficients for the phase p.

6. The device of claim 5, wherein the integrated circuit expands the new sharpening-scaling filter coefficients from 10 bits to 11 bits.

7. The device of claim 5, further comprising:
a sharpening strength adjuster to adaptively adjust the sharpening strength to prevent unwanted enhancement on artifacts.

8. The device of claim 7, wherein the sharpening strength adjuster adaptively adjusts the sharpening strength to be reduced by a certain value if Qp is greater than a threshold according to $$\alpha = \max(\alpha_0 - k(\max(0, Qp-\tau)), \alpha_{min})$$

where $\alpha_{min}$ is a minimum sharpening strength; $\tau$ is a threshold determined by a distance to a last I frame and a codec type; k is a tunable constant; Qp is a quantization step; and $\alpha_0$ is a default sharpening strength.

9. The device of claim 1, wherein the new sharpening-scaling filter coefficients are calculated according to $$\begin{bmatrix} d_{-\frac{m}{2}+1} \\ d_{-\frac{m}{2}+2} \\ d_{-\frac{m}{2}+3} \\ \vdots \\ d_0 \\ d_1 \\ \vdots \\ d_{\frac{m}{2}} \end{bmatrix} =$$

$$\begin{bmatrix} h_0+h_{-1} & h_{-1} & h_{-2} & \cdots & h_{-\frac{m}{2}+1} & 0 & \cdots & 0 \\ h_1 & h_0 & h_{-1} & \cdots & h_{-\frac{m}{2}+2} & h_{-\frac{m}{2}+1} & \cdots & 0 \\ h_2 & h_1 & h_0 & \cdots & h_{-\frac{m}{2}+3} & h_{-\frac{m}{2}+2} & \cdots & 0 \\ \vdots & \vdots & \vdots & \vdots & \vdots & \vdots & \vdots & \vdots \\ h_{\frac{m}{2}-1} & h_{\frac{m}{2}-2} & h_{\frac{m}{2}-3} & \cdots & h_0 & h_{-1} & \cdots & 0 \\ 0 & h_{\frac{m}{2}-1} & h_{\frac{m}{2}-2} & \cdots & h_1 & h_0 & \cdots & h_{-\frac{m}{2}+1} \\ \vdots & \vdots & \vdots & \vdots & \vdots & \vdots & \vdots & \vdots \\ 0 & 0 & 0 & \cdots & 0 & h_{\frac{m}{2}-1} & \cdots & h_0+h_1 \end{bmatrix}\begin{bmatrix} c_{-\frac{m}{2}+1} \\ c_{-\frac{m}{2}+2} \\ c_{-\frac{m}{2}+3} \\ \vdots \\ c_0 \\ c_1 \\ \vdots \\ c_{\frac{m}{2}} \end{bmatrix}$$

where $$d_i, -\frac{m}{2}+1 \leq i \leq \frac{m}{2},$$

are the new sharpening-scaling filter coefficients; $h_i$ are the sharpening filter coefficients; and $$c_i, -\frac{m}{2}+1 \leq i \leq \frac{m}{2},$$

denotes the original scaling filter coefficients.

10. An integrated circuit comprising:
a single scaling filter to filter a video signal once to perform both sharpening and scaling;
a memory to store original scaling filter coefficients for the single scaling filter; and
a circuit to calculate new sharpening-scaling filter coefficients derived from the original scaling filter coefficients and one of sharpening filter coefficients for a sharpening filter and a sharpening strength and to apply the new sharpening-scaling filter coefficients to the single scaling filter;
wherein the single scaling filter filters the video signal according to $$z_q = \sum_{i=-\frac{m}{2}+1}^{\frac{m}{2}} d_i x_{\left\lfloor \frac{q}{s} \right\rfloor + i}$$

where x is the video signal; $d_i$ are the new sharpening-scaling filter coefficients; m denotes an even number of taps; s denotes the scaling ratio; q denotes a coordination index after scaling; and i is an index for a tap of the single scaling filter.

11. The integrated circuit of claim 10, wherein the single scaling filter comprises a polyphase m-tap finite impulse response (FIR) scaling filter.

12. The integrated circuit of claim 11, wherein the new sharpening-scaling filter coefficients are derived according to $$\begin{bmatrix} d_{-1} \\ d_0 \\ d_1 \\ d_2 \end{bmatrix} = \begin{bmatrix} h_0+h_{-1}b_1 & h_{-1} & 0 & h_1 a_4 \\ h_1+h_{-1}b_2 & h_0 & h_{-1} & h_1 a_3 \\ h_{-1}b_3 & h_1 & h_0 & h_{-1}+h_1 a_2 \\ h_{-1}b_4 & 0 & h_1 & h_0+h_1 a_1 \end{bmatrix}\begin{bmatrix} c_{-1} \\ c_0 \\ c_1 \\ c_2 \end{bmatrix}$$

where $d_i$, $-1 \leq i \leq 2$, are the new sharpening-scaling filter coefficients; $c_i$, $-1 \leq i \leq 2$, are the original scaling filter coefficients; $h_i$, $-1 \leq i \leq 1$, are the sharpening filter coefficients; $a_i$, $1 \leq i \leq 4$, are forward prediction coefficients; and $b_i$, $1 \leq i \leq 4$, are backward prediction coefficients.

13. The integrated circuit of claim 12, wherein the polyphase m-tap finite impulse response (FIR) scaling filter has a plurality of phases.

14. The integrated circuit of claim 13, wherein the new sharpening-scaling filter coefficients are calculated according to a first order approximation of $$\begin{bmatrix} d_{p,-1} \\ d_{p,0} \\ d_{p,1} \\ d_{p,2} \end{bmatrix} =$$

$$\left( \begin{bmatrix} \alpha+256 & -\alpha & 0 & 0 \\ -\alpha & 2\alpha+256 & -\alpha & 0 \\ 0 & -\alpha & 2\alpha+256 & -\alpha \\ 0 & 0 & -\alpha & \alpha+256 \end{bmatrix} \begin{bmatrix} c_{p,-1} \\ c_{p,0} \\ c_{p,1} \\ c_{p,2} \end{bmatrix} + \begin{bmatrix} 128 \\ 128 \\ 128 \\ 128 \end{bmatrix} \right) >> 8$$

where $$h_{-1} = h_1 = -\frac{\alpha}{256} * (256)$$

and $$h_0 + h_{-1} + h_1 = 1.0 \left( h_0 = 1 + \frac{2\alpha}{256} \right) * 256$$

where α is the sharpening strength in a range of −127-+127; $a_2$, $a_3$ and $a_4$ are set to zero; $b_2$, $b_3$ and $b_4$ are set to zero; $b_1$ and $a_1$ are set to 1; $c_{p,i}$, $-1 \leq i \leq 2$, represent the original scaling filter coefficients for a phase p; and $d_{p,i}$, $-1 \leq i \leq 2$, represent the new sharpening-scaling filter coefficients for the phase p.

15. The integrated circuit of claim 14, wherein the circuit expands the new sharpening-scaling filter coefficients from 10 bits to 11 bits.

16. The integrated circuit of claim 14, further comprising:
a sharpening strength adjuster to adaptively adjust the sharpening strength to prevent unwanted enhancement on artifacts.

17. The integrated circuit of claim 16, wherein the sharpening strength adjuster adaptively adjusts the sharpening strength to be reduced by a certain value if Qp is greater than a threshold according to $$\alpha = \max(\alpha_0 - k(\max(0, Qp - \tau)), \alpha_{mi})$$

where $\alpha_{min}$ is a minimum sharpening strength; τ is a threshold determined by a distance to a last I frame and a codec type; k is a tunable constant; Qp is a quantization step; and $a_o$ is a default sharpening strength.

18. The integrated circuit of claim 10, wherein the new sharpening-scaling filter coefficients are calculated according to $$\begin{bmatrix} d_{-\frac{m}{2}+1} \\ d_{-\frac{m}{2}+2} \\ d_{-\frac{m}{2}+3} \\ \vdots \\ d_0 \\ d_1 \\ \vdots \\ d_{\frac{m}{2}} \end{bmatrix} =$$

$$\begin{bmatrix} h_0+h_{-1} & h_{-1} & h_{-2} & \cdots & h_{-\frac{m}{2}+1} & 0 & \cdots & 0 \\ h_1 & h_0 & h_{-1} & \cdots & h_{-\frac{m}{2}+2} & h_{-\frac{m}{2}+1} & \cdots & 0 \\ h_2 & h_1 & h_0 & \cdots & h_{-\frac{m}{2}+3} & h_{-\frac{m}{2}+2} & \cdots & 0 \\ \vdots & \vdots & \vdots & \vdots & \vdots & \vdots & & \vdots \\ h_{\frac{m}{2}-1} & h_{\frac{m}{2}-2} & h_{\frac{m}{2}-3} & \cdots & h_0 & h_{-1} & \cdots & 0 \\ 0 & h_{\frac{m}{2}-1} & h_{\frac{m}{2}-2} & \cdots & h_1 & h_0 & \cdots & h_{-\frac{m}{2}+1} \\ \vdots & \vdots & \vdots & \vdots & \vdots & \vdots & & \vdots \\ 0 & 0 & 0 & \cdots & 0 & h_{\frac{m}{2}-1} & \cdots & h_0+h_1 \end{bmatrix} \begin{bmatrix} c_{-\frac{m}{2}+1} \\ c_{-\frac{m}{2}+2} \\ c_{-\frac{m}{2}+3} \\ \vdots \\ c_0 \\ c_1 \\ \vdots \\ c_{\frac{m}{2}} \end{bmatrix}$$

where $$d_i, -\frac{m}{2}+1 \leq i \leq \frac{m}{2},$$

are the new sharpening-scaling filter coefficients; $h_i$ are the sharpening filter coefficients; and $$c_i, -\frac{m}{2}+1 \leq i \leq \frac{m}{2},$$

denotes the original scaling filter coefficients.

19. A processor comprising:
a single scaling filter to filter a video signal once to perform both sharpening and scaling;
a memory to store original scaling filter coefficients for the scaling filter; and
an integrated circuit to calculate new sharpening-scaling filter coefficients derived from the original scaling filter coefficients and one of sharpening filter coefficients for a sharpening filter and a sharpening strength and to apply the new sharpening-scaling filter coefficients to the single scaling filter;
wherein the single scaling filter filters the video signal according to $$z_q = \sum_{i=-\frac{m}{2}+1}^{\frac{m}{2}} d_i x_{\lfloor \frac{q}{s} \rfloor + i}$$

where x is the video signal; $d_i$ are the new sharpening-scaling filter coefficients; m denotes an even number of taps; s denotes the scaling ratio; q denotes a coordination index after scaling; and i is an index for a tap of the single scaling filter.

20. The processor of claim 19, wherein the single scaling filter comprises a polyphase m-tap finite impulse response (FIR) scaling filter.

21. The processor of claim 20, wherein the new sharpening-scaling filter coefficients are derived according to $$\begin{bmatrix} d_{-1} \\ d_0 \\ d_1 \\ d_2 \end{bmatrix} = \begin{bmatrix} h_0+h_{-1}b_1 & h_{-1} & 0 & h_1 a_4 \\ h_1+h_{-1}b_2 & h_0 & h_{-1} & h_1 a_3 \\ h_{-1}b_3 & h_1 & h_0 & h_{-1}+h_1 a_2 \\ h_{-1}b_4 & 0 & h_1 & h_0+h_1 a_1 \end{bmatrix} \begin{bmatrix} c_{-1} \\ c_0 \\ c_1 \\ c_2 \end{bmatrix}$$

where $d_i$, $-1 \leq i \leq 2$, are the new sharpening-scaling filter coefficients; $c_i$, $-1 \leq i \leq 2$, are the original scaling filter coefficients; $h_i$, $-1 \leq i \leq 1$, are the sharpening filter coefficients; $1 \leq i \leq 4$, are forward prediction coefficients; and $b_i$, $1 \leq i \leq 4$, are backward prediction coefficients.

22. The processor of claim 21, wherein the polyphase m-tap finite impulse response (FIR) scaling filter has a plurality of phases.

23. The processor of claim 22, wherein the new sharpening-scaling filter coefficients are calculated according to a first order approximation of $$\begin{bmatrix} d_{p,-1} \\ d_{p,0} \\ d_{p,1} \\ d_{p,2} \end{bmatrix} = \left( \begin{bmatrix} \alpha+256 & -\alpha & 0 & 0 \\ -\alpha & 2\alpha+256 & -\alpha & 0 \\ 0 & -\alpha & 2\alpha+256 & -\alpha \\ 0 & 0 & -\alpha & \alpha+256 \end{bmatrix} \begin{bmatrix} c_{p,-1} \\ c_{p,0} \\ c_{p,1} \\ c_{p,2} \end{bmatrix} + \begin{bmatrix} 128 \\ 128 \\ 128 \\ 128 \end{bmatrix} \right) >> 8$$

where $$h_{-1} = h_1 = -\frac{\alpha}{256} * (256)$$

and $$h_0 + h_{-1} + h_1 = 1.0 \left( h_0 = 1 + \frac{2\alpha}{256} \right) * 256$$

where $\alpha$ is the sharpening strength in a range of $-127$-+$127$; $a_2$, $a_3$ and $a_4$ are set to zero; $b_2$, $b_3$ and $b_4$ are set to zero; $b_1$ and $a_1$ are set to 1; $c_{p,i}$, $-1 \leq i \leq 2$, represent the original scaling filter coefficients for a phase p; and $d_{p,i}$, $-1 \leq i \leq 2$, represent the new sharpening-scaling filter coefficients for the phase p.

24. The processor of claim 19, wherein the new sharpening-scaling filter coefficients are calculated according to $$\begin{bmatrix} d_{-\frac{m}{2}+1} \\ d_{-\frac{m}{2}+2} \\ d_{-\frac{m}{2}+3} \\ \vdots \\ d_0 \\ d_1 \\ \vdots \\ d_{\frac{m}{2}} \end{bmatrix} =$$

$$\begin{bmatrix} h_0+h_{-1} & h_{-1} & h_{-2} & \cdots & h_{-\frac{m}{2}+1} & 0 & \cdots & 0 \\ h_1 & h_0 & h_{-1} & \cdots & h_{-\frac{m}{2}+2} & h_{-\frac{m}{2}+1} & \cdots & 0 \\ h_2 & h_1 & h_0 & \cdots & h_{-\frac{m}{2}+3} & h_{-\frac{m}{2}+2} & \cdots & 0 \\ \vdots & \vdots & \vdots & \vdots & \vdots & \vdots & & \vdots \\ h_{\frac{m}{2}-1} & h_{\frac{m}{2}-2} & h_{\frac{m}{2}-3} & \cdots & h_0 & h_{-1} & \cdots & 0 \\ 0 & h_{\frac{m}{2}-1} & h_{\frac{m}{2}-2} & \cdots & h_1 & h_0 & \cdots & h_{-\frac{m}{2}+1} \\ \vdots & \vdots & \vdots & \vdots & \vdots & \vdots & & \vdots \\ 0 & 0 & 0 & \cdots & 0 & h_{\frac{m}{2}-1} & \cdots & h_0+h_1 \end{bmatrix} \begin{bmatrix} c_{-\frac{m}{2}+1} \\ c_{-\frac{m}{2}+2} \\ c_{-\frac{m}{2}+3} \\ \vdots \\ c_0 \\ c_1 \\ \vdots \\ c_{\frac{m}{2}} \end{bmatrix}$$

where $$d_i, -\frac{m}{2}+1 \leq i \leq \frac{m}{2},$$

are the new sharpening-scaling filter coefficients; $h_i$ are the sharpening filter coefficients; and $$c_i, -\frac{m}{2}+1 \leq i \leq \frac{m}{2},$$

denotes the original scaling filter coefficients.

25. A wireless device comprising:
scaling filtering means for scaling filtering a video signal once to perform both sharpening and scaling;
storing means for storing original scaling filter coefficients for the scaling filtering means; and
calculating means for calculating new sharpening-scaling filter coefficients derived from the original scaling filter coefficients and one of sharpening filter coefficients for a sharpening filter and a sharpening strength and for applying the new sharpening-scaling filter coefficients to the scaling filtering means;
wherein the scaling filtering means comprises a single polyphase m-tap finite impulse response (FIR) scaling filter;
wherein the polyphase m-tap finite impulse response (FIR) scaling filter has a plurality of phases; and
wherein the new sharpening-scaling filter coefficients are calculated according to a first order approximation of $$\begin{bmatrix} d_{p,-1} \\ d_{p,0} \\ d_{p,1} \\ d_{p,2} \end{bmatrix} =$$

$$\left( \begin{bmatrix} \alpha+256 & -\alpha & 0 & 0 \\ -\alpha & 2\alpha+256 & -\alpha & 0 \\ 0 & -\alpha & 2\alpha+256 & -\alpha \\ 0 & 0 & -\alpha & \alpha+256 \end{bmatrix} \begin{bmatrix} c_{p,-1} \\ c_{p,0} \\ c_{p,1} \\ c_{p,2} \end{bmatrix} + \begin{bmatrix} 128 \\ 128 \\ 128 \\ 128 \end{bmatrix} \right) >> 8$$

where $\alpha$ is the sharpening strength in a range of $-127$-+$127$; $c_{p,i}$, $-1 \leq i \leq 2$, represent the original scaling filter coefficients for a phase p; and $d_{p,i}$, $-1 \leq i \leq 2$, represent the new sharpening-scaling filter coefficients for the phase p.

* * * * *